G. M. BURD.
UTENSIL SUPPORT FOR GAS BURNERS.
APPLICATION FILED SEPT. 22, 1915.

1,187,037.

Patented June 13, 1916.

WITNESSES:

INVENTOR
George M. Burd
BY
ATTORNEY

UNITED STATES PATENT OFFICE.

GEORGE M. BURD, OF SEATTLE, WASHINGTON.

UTENSIL-SUPPORT FOR GAS-BURNERS.

1,187,037. Specification of Letters Patent. Patented June 13, 1916.

Application filed September 22, 1915. Serial No. 51,921.

*To all whom it may concern:*

Be it known that I, GEORGE M. BURD, citizen of the United States, residing at Seattle, in the county of King and State of Washington, have invented a certain new and useful Improvement in Utensil-Supports for Gas-Burners, of which the following is a specification.

My invention relates to improvements in utensil supports, and the object of my improvements is to provide a utensil supporting plate which may be removably associated with a single gas burner, and which shall be adapted by its form to so direct the flame of such burner that each of two different cooking utensils, when placed thereon, shall be subjected to the heat of such flame whereby a larger proportion of the heat produced by the burning of a given quantity of gas may be effectively applied than would be if each of said cooking utensils was heated by a separate burner. I accomplish this object by devices illustrated in the accompanying drawings wherein—

Figure 1:
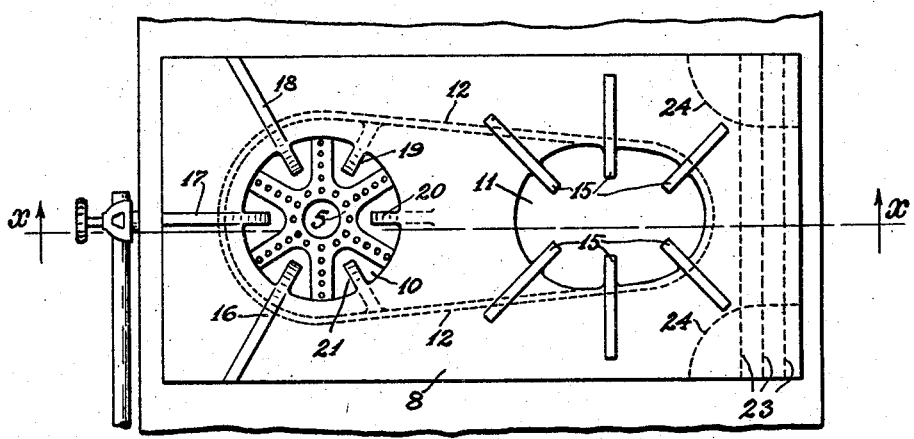
Figure 2:
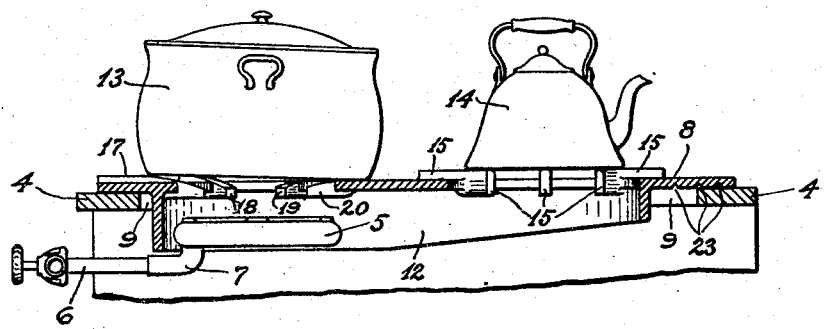
Figure 3:
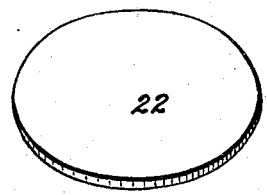

Figure 1 is a plan view of a cooking utensil support embodying my invention disposed on one form of a gas stove; Fig. 2 is a view of the same in vertical section on broken line $x$, $x$ of Fig. 1 showing two cooking utensils in side elevation placed thereon; and Fig. 3 is a view in perspective of a detail of my invention.

Referring to the drawings, throughout which like reference numerals indicate like parts, 4 indicates the upper portion of a gas stove within which is disposed a gas burner 5 which may be supplied with gas through a valve-controlled pipe 6 which connects with a downwardly extended elbow 7 that is integral with the underside of said gas burner 5.

On the top of the gas stove 4 is disposed to rest a utensil-supporting plate 8, of cast iron of rectangular form, which covers a large rectangular opening 9 that extends through the top wall of said gas stove 4. The plate 8 is provided with a circular opening 10 near one of its ends, and an oblong opening 11 near the other of its ends. The circular opening 10 in the plate 8 is disposed directly above the gas burner 5, and extending downwardly from the under side of said plate 8 to a plane lower than the under side of the burner 5 is an integral flange 12 which forms a fence (indicated by dotted lines in Fig. 1) that extends in lines between opposite tangential points on each of the edges of both of the openings 10 and 11 thence in a semi-circle near the edge of each of said openings 10 and 11, whereby, when the circular opening 10 is covered by a cooking utensil, as a pot 13, then air heated by the flame of said burner 5 may first engage with the bottom of such utensil and thence be conducted to the opening 11 to rise therethrough to engage with the bottom of another utensil, as a tea kettle 14, thus to heat the contents of both of said utensils by the operation of the single burner 5.

In order to provide a space for an upward air draft through the opening 11, between the bottom of a utensil and the top surface of the plate 8, there are a plurality of integral supporting lugs 15 disposed to project inwardly from the edges of said opening 11 in converging lines, and the top edges of said lugs 15 are higher than the top surface of said plate 8, as more clearly shown in Fig. 2; and to provide space for an inward air draft through the opening 10, between a portion of the bottom of a utensil, as the pot 13, and the top surface of said plate 8, there are integral lugs 16, 17, 18, 19, 20 and 21 disposed to project inwardly from the edges of said opening 10 in converging lines, and the top surfaces of the lugs 16, 17, and 18 are higher than the adjacent portions of the top surface of the plate 8 while the top surfaces of the lugs 19, 20 and 21 do not project above the top surface of the plate 8, whereby when a utensil, as a pot 13, (or when a cover, as a cover 22 of Fig. 3) is placed over the opening 10 it will rest with its bottom in an inclined plane to cause it to lean toward the opening 11 thus to permit air to be drawn into the opening 10 through the space between the top surface of the plate 8 and the raised side of the bottom of said utensil, as shown in Fig. 2, thus to aid combustion of the gas and cause the heated air to flow toward the opening 11.

Since gas stoves are of different forms with respect to the openings through their top walls whereby some of them may not be adapted to receive a utensil-supporting plate embodying my invention of the rectangular form, like the plate 8 of Figs. 1 and 2, I have provided grooves 23 which are formed in the underside surface of the rear end of said plate 8 to extend transversely thereof in parallel lines equi-distant one from another, as indicated by dotted lines in Fig. 1, to facilitate the operation of making the plate shorter by breaking off a portion of the length of such plate on the line of a desired one of said grooves 23, and in order to facilitate the operation of making the rear end portion of said plate 8 of less width when desired, I have provided grooves in the under surface of said rear end portion that extend each in a curve from a different one of opposite sides of said plate 8 to terminate on the rear end thereof, as indicated by dotted lines 24 in Fig. 1.

Manifestly, for the gas stove 4 there may be substituted any convenient form of frame within which is disposed a gas burner, as the gas burner 5, upon the top of which a utensil-supporting plate, like the plate 8, may be disposed, and changes may be made in the forms, dimensions and arrangement of parts of my invention without departing from the spirit thereof.

What I claim is:

1. In a utensil support of the class described, the combination with a metal plate having two openings therethrough, which openings are disposed with respect to each other to adapt them each to be covered by a separate utensil at the same time, of a gas burner disposed beneath one of said openings, and a plurality of utensil-supporting lugs provided on top of said plate adjacent to one portion of the edge of said one of said openings and disposed to cause a utensil to lean toward the other of said openings when such utensil is disposed to rest on said lugs to cover one of said openings.

2. In a utensil support of the class described, the combination with a metal plate having two openings therethrough, which openings are disposed with respect to each other to adapt them each to be covered by a separate utensil at the same time, of a gas burner disposed beneath one of said openings, a plurality of utensil-supporting lugs provided on top of said plate adjacent to one portion of the edge of said one of said openings and disposed to cause a utensil to lean toward the other of said openings when such utensil is disposed to rest on said lugs to cover said one of said openings, and a downwardly extended flange integrally attached to the underside of said metal plate and disposed to form an endless fence around an area of said plate through which area extends both of said openings whereby air heated by the operation of said burner may be conducted to the more distant one of said openings.

3. In a utensil support of the class described, the combination with a metal plate having two openings therethrough which openings are disposed with respect to each other to adapt them each to be covered by a separate utensil at the same time, of a plurality of utensil-supporting lugs provided on the top of said plate adjacent to one portion of the edge of one of said openings and disposed to cause a utensil to lean toward the other of said openings when such utensil is disposed to rest on said lugs to cover said one of said openings; a gas burner disposed beneath said one of said openings; a plurality of utensil supporting lugs provided on the top of said plate adjacent to the edge of the other of said openings to support a utensil with its bottom surface in a plane higher than the plane of the top surface of said plate; and a downwardly extended flange integrally attached to the under side of said metal plate and disposed to form an endless fence around an area of said plate through which area extends both of said openings, whereby air heated by the operation of said burner may be conducted to the more distant one of said openings.

In witness whereof I hereunto subscribe my name this twenty-ninth day of July A. D., 1915.

GEORGE M. BURD.

Witnesses:
O. JOHNSON,
FRANK WARREN.

Copies of this patent may be obtained for five cents each, by addressing the "Commissioner of Patents, Washington, D. C."